United States Patent [19]

Panzera

[11] 4,075,364

[45] Feb. 21, 1978

[54] POROUS CERAMIC SEALS AND METHOD OF MAKING SAME

[75] Inventor: Carlino Panzera, Belle Mead, N.J.

[73] Assignee: Brunswick Corporation, Skokie, Ill.

[21] Appl. No.: 677,258

[22] Filed: Apr. 15, 1976

[51] Int. Cl.$^2$ .............................................. B05D 3/06
[52] U.S. Cl. ................................ 427/34; 29/156.8 R; 29/423; 29/458; 228/120; 228/122; 427/423; 428/545; 428/610; 428/621
[58] Field of Search .................................. 427/34, 423; 29/156.8 R, 423, 458; 228/120, 121, 122, 178; 428/285, 288

[56] References Cited

U.S. PATENT DOCUMENTS

| 3,053,694 | 9/1962 | Daunt et al. ................ 29/156.8 R |
| 3,413,136 | 11/1968 | Emanuelson et al. ............... 427/34 |
| 3,526,593 | 9/1970 | Levinstein .......................... 228/178 |

Primary Examiner—John H. Newsome
Attorney, Agent, or Firm—John G. Heimovics; David S. Guttman; Sheldon L. Epstein

[57] ABSTRACT

A ceramic-metal composite laminate capable of exposure to high temperature differentials without damage, consisting of an inner ceramic layer, an outer metal layer and an intermediate interface layer of a low modulus metallic low density structure having a high melting point. The ceramic layer is secured to the low modulus structure directly or through an intermediate ceramic-metal composite, and the outer metal layer is brazed to the intermediate low modulus layer. Thermal strains caused by a temperature differential between the inner and outer layers are taken up without harmful effect by the intermediate low modulus layer.

2 Claims, 7 Drawing Figures

POROUS CERAMIC SEALS AND METHOD OF MAKING SAME

BACKGROUND OF THE INVENTION

1. Field of the Invention

This invention relates to ceramic-metal laminates, and more particularly, to the method for making a laminate of this type which enables thermal strains to be taken up without harmful effects and to the article produced by the method.

2. Description of Prior Art

A number of methods are known in the prior art for joining a metal member to a ceramic section. For example, U.S. Pat. No. 2,996,401 shows a method for use in electron tube manufacture where the surface of the ceramic body is metallized with refractory metals and the metal member is then brazed to the metallized coating. Another example, U.S. Pat. No. 3,114,612, shows a ceramic laminate useful for high temperature applications where the ceramic is coated with a metallic bonding medium and welded to a corrugated stainless steel sheet.

While these prior art methods are satisfactory in uses for which they were designed, in high temperature operation under oxidizing conditions and mechanical stress, such as encountered in gas turbine engines, the required laminates must have the ability to withstand the substantial strains due, in part, to extreme differences in amounts of thermal expansion which are created during turbine's operation and in part due to the thermal gradients across them. The prior art items tend to be anisotropic in their ability to absorb thermal strains and there is a need for an attachment method that will respond to thermal strains elastically at moderately low stress levels in all directions.

SUMMARY OF THE INVENTION

Direct joining of ceramic materials to metallic materials is presently limited to materials having small differences in coefficient of thermal expansion (0.5 × 10$^{-6}$ in/in/° F) and in the geometry of the structure (the ceramic material must remain in compression). Differences in coefficient of thermal expansion ($\alpha$) can be minimized by using a technique where materials with closely matched $\alpha$'s are provided adjacent to each other forming a gradient of ceramic ($\alpha_c$), cermets ($\alpha_1 \ldots \alpha_n$, wherein the cermets are mixtures of powdered metals and ceramics varying in density such that with sufficient thickness there can be an infinite number of layers, each having a slightly different $\alpha$) and metal depicted thusly:

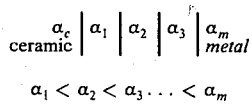

$$\alpha_1 < \alpha_2 < \alpha_3 \ldots < \alpha_m$$

Unfortunately, this technique is severely limited to low temperature use because of the temperature limits imposed by: (1) relatively low oxidation resistance of low thermal expansion alloys, (2) wide diversities of expansions at elevated temperatures of the metal, cermets and ceramic materials, and (3) stresses in the ceramic caused by thermal gradient.

The development of high temperature abradable gas path seals for use in turbine engines has necessitated the development of a method for making a ceramic-metal laminate which is not limited by differences in expansion rates or lack of oxidation resistance.

In such high thermal gradient conditions where the surface of the ceramic experiences temperatures of 1000° to 3000° F and there is a temperature gradient across the ceramic, the hot surface expands greater than the cooler surface. If this expansion is constrained as in the ceramic-cermet-metal laminate excessive stresses are built up in the ceramic material causing failure by thermally cracking. Thus, this laminate is not acceptable where thermal gradients in excess of 500° to 1000° F occur. For example, when the ceramic is alumina and the metal is a Ni-Al alloy, then a temperature gradient of 500° F in such a structure would not perform properly.

Accordingly, the present invention comprises a ceramic layer; a three dimensional, flexible, resilient, low modulus, low density, metallic structural interface secured to the ceramic layer; and a metal member fastened to the low modulus metallic structure. Thermal strains caused by differences in the coefficients of thermal expansion of the metal member and ceramic are absorbed by the low modulus material interface which has sufficient tensile strength, resistance to oxidation at high temperatures and resilient flexibility.

The principal object of this invention is to provide a ceramic-metal laminate which can be used in high temperature applications, especially seals for blades in gas turbine engines.

Another object of this invention is to provide ceramic-metal laminate, such as the seals for blades in a gas turbine engine, wherein the ceramic layer is porous, thereby abrading easier than substantially solid ceramic material.

Yet another object of this invention is a method for making such a porous ceramic material.

Yet another object of this invention is to provide an attachment interface between ceramics and metals operating cyclically to extreme temperatures (either high or low) from ambient with high temperature gradients across them which is essentially isotropic with regard to its resiliency and low modulus characteristics.

Yet another object of this invention is to provide an attachment interface between ceramics and metals operating with high temperature gradients between them that has a low thermal conductivity to minimize heat losses.

Further objects will become apparent from the following detailed description of the invention.

DESCRIPTION OF THE INVENTION

Figure 1:
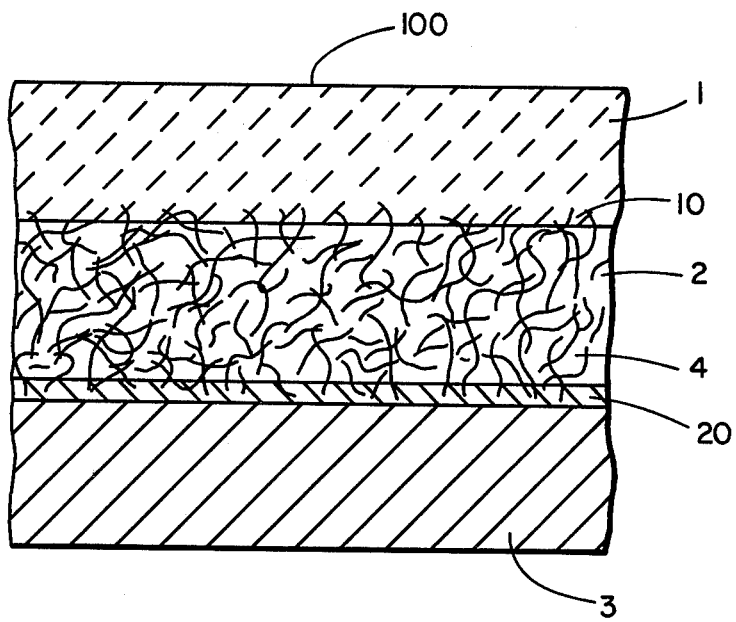
FIG. 1 is a sectional view of the primary embodiment of this invention depicting the ceramic-resilient interface-metal composite.

In the embodiment shown in FIG. 1, a cross section view of an abradable high temperature seal 100 for a gas turbine engine is shown. Ceramic member 1 may be made of high temperature ceramics such as alumina, stabilized cubic zirconia, magnesia, zircon ($ZrO_2.SiO_2$) fosterite ($2MgO.SiO_2$), mullite, mullite $\xi$ quartz, aluminum di-boride, calcia, yttria, glass, silicon carbide, silicon nitride, alumino-borosilicate, etc., that have any desired thickness and degree of porosity such as needed for high temperature abradable seals.

The ceramic member 1 has a very low coefficient of thermal expansion generally in the range of about $1 \times 10^{-6}$ to $8 \times 10^{-6}$ inches per inch per ° F. Conversely, the metal base 3, that the ceramic member 1 is ultimately joined to, has a very high coefficient of thermal expansion in the range of about $2 \times 10^{-6}$ to $20 \times 10^{-6}$ inch per inch per ° F. In the environment of a gas turbine engine, where the outer surface of the ceramic member 1 is subjected to temperatures in the neighborhood of 1800°-3600° F, while the exposed surface of the metal is subjected to a temperature range of only several hundred ° F., a direct joining of the two would cause immediate rupture of the ceramic due to the difference in coefficients of expansion and to the effect of the temperature gradient through the thickness of the ceramic. Thus, in this invention and the primary embodiment of this invention, a resilient, low modulus, elastic interface 2 is secured to both the ceramic member 1 and the metal base 3 absorbing geometric differences caused by the variations in thermal expansion of the two materials and by the temperature gradient.

The interface 2 comprises a three dimensional, flexible, resilient, low modulus, low density, porous, high melting point metallic fiber web or mat structure such as described in detail in U.S. Pat. Nos. 3,469,297; 3,505,038; or 3,127,668. Typical alloys used for the fibers of this interface are sold under the trademarks of Hastelloy X, Hoskins 875, Haynes 188, DH 242, as well as the nickel base super alloys and the quadrinary and quintinary alloys of iron, cobalt, nickel, chromium, aluminum and yttrium (or the rare earths). Desirably, the porous web or mat structure has a density of approximately 35%, although depending upon the particular application the web comprising the interface 2 can have a density varying anywhere from 5 to 80%. It will be apparent that the exact alloy employed in making the mat will be dictated by the temperature, oxidation, and stress conditions to be encountered in the ultimate use.

One method of making the embodiment shown in FIG. 1 is to braze a web interface 2 to the metal base 3 as shown at 20. The ceramic layer 1 is formed by plasma spraying the ceramic material onto the exposed face of the interface 2 wherein the ceramic material impregnates into the surface of the web interface 2 bonding the ceramic mechanically to the fibers of the interface 2. Subsequently, additional plasma spraying of the ceramic will provide the desired thickness of the ceramic layer 1. The product thus produced is a ceramic-metal composite having a resilient interface so that when the metallic member expands due to thermal expansion a much greater amount than the expansion of the ceramic material, the interface can absorb the different amounts of thermal expansions of the two materials. Thus, a composite is provided where there is a high degree of thermal expansion mismatched between the ceramic 1 and the adjoining metal 3, but able to remain intact over extreme thermal cyclings because of the ability of the metal web interface 2 to absorb the differential expansion and the resulting thermal strain.

Figure 2:
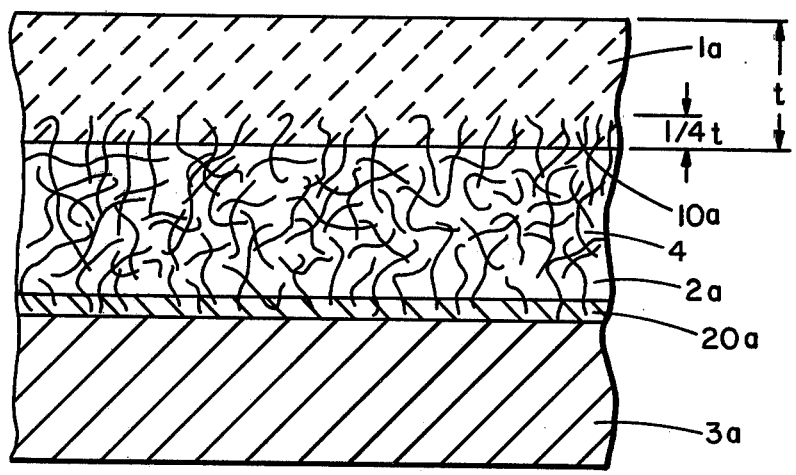
FIG. 2 is another sectional view of the invention.

In FIG. 2, there is an enlarged view of the basic embodiment as shown in FIG. 1, wherein the metal fibers 4 of the web interface 2a are shown to protrude into the ceramic surface up to approximately ¼ the thickness of the ceramic material 1a while the other surface of the interface 2a is brazed at 20a to the metal plate 3a. Here, the ceramic layer 1a has embedded into its surface the metal felted mat interface 2a. The ceramic and metal alloy must be so selected so as to minimize the chemical reaction between the metal fibers of the interface and the ceramic thereby providing primarily mechanical bonding between the two. The ceramic-metal interface composite portion may be formed by pressing the metal felt interface into a plastic mass of the ceramic material for a distance sufficient to insure a mechanical bond of sufficient strength; this being another method of joining the ceramic and the interface. As mentioned above, about ¼ of the thickness of the ceramic layer 1a would be sufficient to have the interface 2a embedded therein; however, this can be varied as may be required by the design. After the mat is embedded into the plastic ceramic, the thus formed composite is dried and fired. As mentioned earlier, the web interface can be attached to the metal base first or may be attached to the metal base after the ceramic has been joined to the interface, as desired.

Figure 6:
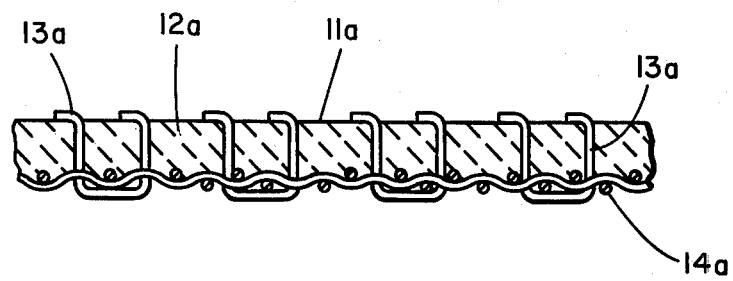
FIG. 6 is a sectional view of an intermediate product of one of the embodiments of the invention.

In another embodiment of the invention, approximately ⅜ of an inch U-shaped card wire staples are secured to a fabric base and forced therethrough in a generally upright position. A ceramic-water slurring mixture of ceramic fibers and/or powders is deposited on the fabric and confined within the area of the metal staples. This initial material is then sintered in a furnace in order to react the ceramic slurry to form the desired ceramic material and at the same time mechanically incapsulate the wire staples. As shown in FIG. 6, the fabric 14a has wire staples 13a which are imbedded in the ceramic material 12a thereby defining a ceramic-wire layer 11a. When the ceramic is fired in the furnace, the fabric layer 14a disintegrates, leaving the staples 13a imbedded in the ceramic 12a. The protruding staples of the layer 13a may be bent flat on both surfaces for convenience. As with the metal fiber web interface material, chemical reaction between the wire staples and the ceramic material must be minimized, otherwise stresses resulting from the mismatch of the coefficients of expansion ($\alpha$'s) would cause cracking of the material. Chemical reaction between the metal and the composite would result in a strong bond between them which would promote degradation in the ceramic and metal interfacial area and minimize movement of the two.

Figure 3:
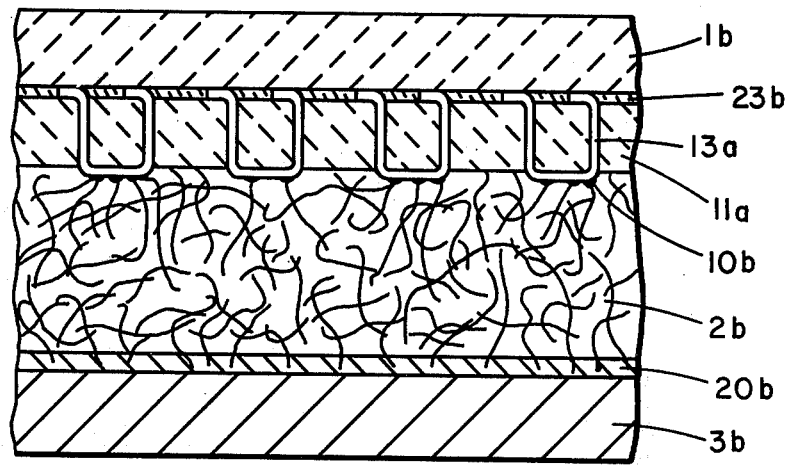
FIG. 3 is a sectional view of another embodiment of the invention.

As seen in FIG. 3, this ceramic layer with staples 11a therein is secured to a purely ceramic layer 1b by glass frit 23b by placing the two in a furnace at elevated temperatures for a short period of time. A metal base 3b is brazed as shown at 20b to a porous web interface 2b. The ceramic laminate with the exposed staples is then spot brazed to the web interface 2b at 10b. Since the fibers of the interface 2b are not 100% dense, and since obviously the staples 13a of the ceramic layer are not 100% dense, the brazing of the two may be 100%, but the total area of the metal will not be greater than the metal density of the smallest metal material. This type of composite also exhibits the same characteristics and desirability as the basic embodiment shown in FIG. 1.

Figure 4:
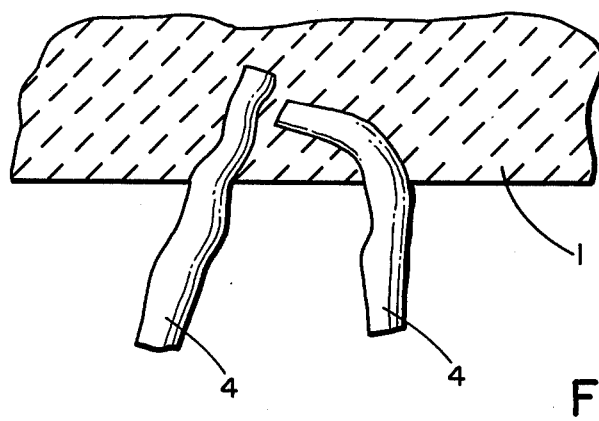
FIG. 4 is an enlarged sectional view of a facet of the invention.
Figure 5:
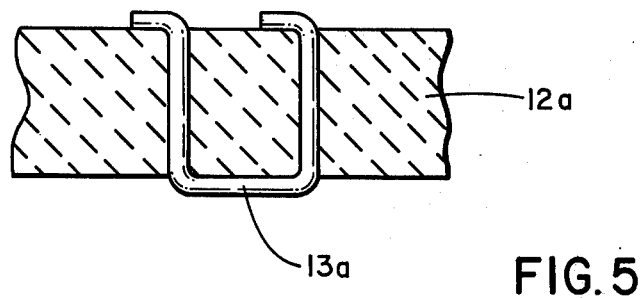
FIG. 5 is an enlarged sectional view of another facet of the invention.

It should be noted that in FIGS. 4 and 5 the geometric bond between the ceramic 1 and the fibers 4 of the interface 2 or the staples 13a promote a mechanical bond. This particular characteristic is extremely important for the operation of this material.

Besides being made from the metals listed for the interface, the staple 13a may also be made from materials such as platinum, tungsten, molybdenum and the like depending upon the environment. The ceramic materials used in this invention are those commercially found available as high temperature ceramics as well as the unexpected materials found by me and described hereinafter.

In the use of ceramic materials for high temperature seals and gas turbines, and especially where the seals are abraded such as taught by the prior art, for example in U.S. Pat. No. 3,880,550, a sintered product of an alumino silicate ceramic consisting of mullite plus quartz as a high temperature material and insulation (above 2600° F) is very limited. The free quartz present in the available fibers (known by the trade names of Fiberfrax and Kaowool) becomes brittle because the fused quartz devitrifies and converts to cristobalite when exposed to temperatures of 1800° F and over. It has been found that by using a mixture of alumino-silicate fibers and low expansion glass fibers or powders, which is subsequently sintered, a ceramic material may be formed to operate at temperatures in the range of 2200°-3000° F (an increase of well over 400° F for known Fiberfrax). In sintering the mixture, the glass surrounds the alumino-silicate and at the same time dissolves any free quartz and results in a mixture of mullite and glass. This new ceramic has been employed as one of the porous materials used for the ceramic portion of the composite material taught herein. Quite surprisingly, this material was found to exhibit excellent high temperature characteristics. In using a standard alumino-silicate, typically 35-55% $SiO_2$ and 45-65% $Al_2O_3$ at temperatures above 1800° F the fused quartz also devitrifies and forms cristobalite which severly imbrittles the fibers and weakens the general product. By the addition of fibrous or powdered glass to the aluminum silicate the glass reacts with the quartz to form a new glass that will not devitrify. Three types of fiber forming materials having different temperature ranges that, when subject to this glass powder-fiber technique, produce a much better ceramic are alumino-silicate, alumina, and zirconia.

Figure 7:
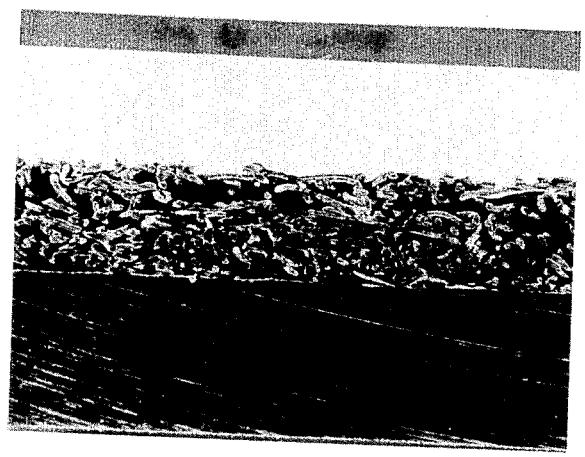
FIG. 7 is a photo-macrograph of the primary embodiment at a 15X magnification.

The cobalt-base super alloy base 3 is shown in FIG. 7; a macrophotograph at 15X. The metal web 2 is about 20% dense, made from Hoskins 875 alloy and brazed to the base 3. A ceramic layer 1 was plasma sprayed on the web and embedded therein as may be seen in the macrophotograph. The ceramic layer 1 was composed of CaO, 4% by weight and $ZrO_2$ 13 96% by weight.

The following specific embodiments of the ceramic-interface-metal composites made in accordance with this invention should not be construed in any way to limit the scope contemplated by this invention.

EXAMPLE I

According to the teachings of U.S. Pat. No. 3,127,668 a felt web made from ½ inch kinked 5 mil wire of Fe-CrAlSi (Hoskins-875) metal alloy was sintered for 15 hours in a furnace vacuum of $10^{-5}$ torr and at a temperature of 2175° F. The web produced had an approximate 30% density. A metal base of a high temperature cobalt base alloy was brazed to the sintered web by exposing the web and the base metal to 2150° F in a vacuum furnace for about 10 minutes. The zirconia, in atmosphere, was plazma sprayed onto the exposed web surface impregnating the web at least 10 mils, and quite surprisingly, the zirconia was then built up to form a zirconia layer of about 100 mils (layers of as much as ¼ inch zirconia have been achieved by me by this method). The formed composite was thermally cycled wherein the zirconia face was subjected to 2900° F and the metal base was exposed to air at ambient temperature over a series of cycles without any appreciable separation of the ceramic zirconia from the metal.

EXAMPLE II

According to the teachings of U.S. Pat. No. 3,127,668 a felt web made from one-half inch kinked 4 mil wire of Hastelloy X metal alloy was sintered for 10 hours in a furnace vacuum of $10^{-5}$ torr and at a temperature of 2175° F. The web produced had an approximate 20% density. A metal base of Hastelloy X alloy was brazed to the sintered web by exposing the web and the base metal to 2150° in a vacuum furnace for about 10 minutes. A ceramic composite of ceramic material and staple card wires was prepared by providing a bed of upstanding 12 mil thick staple wires having a ⅜ inch U-shape projecting through a porous fabric base that holds the staples in a semi-upright position. A water based slurry formed of alumino-silicate mineral fibers having diameters ranging from 8 microns to 80 microns were mixed with a low expansion glass powder (the powder having a size where it will pass through a 325 mesh screen, the powders having a diameter up to 44 microns); the slurry having a composition of 50% aluminum silicate and 50% glass by weight mixed with 50% by volume water. The slurry was deposited on the fabric over and surrounding the upright metal staples and held in place by an external holding container. This slurry-staple composite was sintered at 2200° F for 2 hours in a furnace purged with argon to permit the glass to melt reacting with the alumino-silicate and at the same time form a matrix around the alumino-silicate to eliminate any free quartz — the final product is the staple impregnated low expansion ceramic wherein the ceramic is mullite and glass combination (mullite -3$Al_2O_3$.2$SiO_2$).

In a felted slurry mixture, alumino-silicate fibers, having a diameter of approximately 8 microns and a length of ⅛ of an inch and constituting 98% by weight, were combined with 2% alumino-borosilicate glass fibers, also having a diameter of approximately 8 microns and a length of about ⅛ of an inch, and mixed together with 450 parts of water to one part of solid. This mixture was suctioned deposited to form a porous ceramic felt that was compressed to about 40% density. The densified ceramic felt was sintered at 2900° F in an air atmosphere for about 4 hours wherein the glass fiber melted and reacted tying up the free quartz resulting in a combination of mullite plus glass; the resulting structure being about ⅛ of an inch thick and 65% dense. This ceramic material was attached to one side of the staple ceramic composite by a low expansion glass powder such as, in wt. percent, 80.5 $SiO_2$ - 12.9 $B_2O_3$ - 3.8 $Na_2O$ - 2.2 $Al_2O_3$ - 0.4 $K_2O$ and at the same time the free surface of the metal fiber web was spot brazed using Nicrobraz LM (trademark of Wall Colomony Company) to the other side of the staple-ceramic composite by placing in a furnace for 10 minutes at 2150° F in an argon atmosphere. The finally formed composite was thermally cycled to 1800° F and cooled to ambient. At the end of a 30 cycle period the ceramic had not cracked and the interface had maintained its structural integrity.

EXAMPLE III

According to the teachings of U.S. Pat. No. 3,127,668, a web made from ½ inch kinked 5 mil wire of FeCrAlSi (Hoskins-875) metal alloy was sintered 9 hours in a furnace vacuum of $10^{-5}$ torr and at a temperature of 2175° F. The web produced had an approximate density of 30%. A metal base of high temperature cobalt base alloy was brazed to the sintered web by exposing the web, braze alloy, and base metal to 2150° F in a vacuum furnace for 10 minutes. A mixture of calcia stabilized zirconia and graphite powders (70 - 30 by volume, respectively) was plasma sprayed onto the exposed web surface. The sprayed composite was subsequently exposed to 1700° F for 15 hrs in air. The burned-off sample had a ceramic layer which was noticably more porous than graphite-free zirconia sprayed as described as example I. A second attached web was plasma sprayed coated with a layer of pure calcia stabilized zirconia and without stopping was then coated with a mixture of 70 vol. percent calcia stabilized zirconia and 30 vol. percent graphite. After the graphite was burned off, it was obvious that the layer near the web was of higher density and, therefore, stronger than the outer layer which contained the graphite. Density, as well as strength, can be controlled by controlling the volume fraction of graphite or other sacrificial material.

The ceramic layer may be formed with a variable density and applied such as by plasma spraying. During application the ceramic material contains both permanent and sacrificial material with the sacrificial material varying in amount from 0 to 60%. The inert ceramic material may be selected from one or more of the following materials: stabilized zirconia, calcia, magnesia, yttria, glass, silicon carbide, silicon nitride, alumina, mullite, borides, silicides, and cermets, etc., but not limited thereto. The sacrificial material may be selected from one or more of the following materials: graphite, plastic, aluminum, copper, and sawdust, etc., but not limited thereto. When this variable density ceramic is used as an abradable seal for turbine blades (in a gas turbine engine) it has been found that the lower density material will abrade easier than the higher density materials but still maintain the desired structural characteristics in the high temperature environment.

Examples I, II, and III correspond to three of the embodiments described herein. It is contemplated that those skilled in the art will thoroughly understand that it is possible to change the composition of the ceramic material, substitute different metal alloys for both the metallic base and metal interface. It will be recognized that the invention provides a very effective method of absorbing thermal strains in a ceramic-metal laminate composition structure by providing a low modulous resilient, low density metal fiber mat interface joined to the metal base and the ceramic.

Other technically significant applications of the embodiments of this invention can include gas turbine shrouds, burner cans, vane end walls, magnetohydrodynamic generators, nuclear fusion reactors, and coatings for pistons and cylinders in diesel and gasoline engines.

Although specific embodiments of the invention have been described many modifications and changes may be made to the materials, configurations and methods of making the ceramic-metal composite without departing from the spirit and the scope of the invention as defined in the appended claims.

What is claimed is:

1. A method of making a ceramic-metal composite comprising the steps of:
   (a) providing a metal plate and a metal pad having a density of ranging from 5 to 80%;
   (b) bonding the pad to be the metal plate;
   (c) plasma spraying on the exposed surface of the metal pad a mixture of ceramic material and a sacrificial material where the volume fraction of the sacrificial material is increased from zero percent to 60 percent at convenient intervals to effect strength and porosity required; the sacrificial material being selected from one or more, but not limited to the following: graphite, plastic, aluminum, copper and sawdust; the inert ceramic layer being selected from one or more, but not limited to the following:
   stabilized zirconia, calcia, magnesia, yttria, glass, silicon carbide, silicon nitride, alumina, mullite, borides, silicides, and cermets;
   (d) removal of sacrificial material by a chemical reaction such as oxidation or leaching.

2. A method of making a three layer ceramic-metal composite comprising the steps of:
   (a) providing a resilient metallic layer with a density range of from about 5 to 80% having two surfaces;
   (b) providing a ceramic layer having a controlled porosity and a controlled strength by plasma spraying on one of the surfaces of the low modulus layer a mixture of a ceramic material and a sacrificial material where the volume fraction of the sacrificial material is increased from zero percent to 60 percent at convenient intervals to effect strength and porosity required; the sacrificial material being selected from one or more, but not limited to the following: graphite, plastic, aluminum, copper and sawdust; the inert ceramic layer being selected from one or more, but not limited to the following:
   stabilized zirconia, calcia, magnesia, yttria, glass, silicon carbide, silicon nitride, alumina, mullite, borides, silicides, and cermets;
   (c) removal of sacrificial material by a chemical reaction such as oxidation or leaching;
   (d) providing a plate of metal; and
   (e) bonding the exposed surface of the low modulus layer without the ceramic material to the metal plate to form a composite.

* * * * *